United States Patent
Kawai

[19]

[11] Patent Number: 5,974,963
[45] Date of Patent: Nov. 2, 1999

[54] SUPPORTING DEVICE FOR ROLLED RECORDING SHEET

[75] Inventor: Muneaki Kawai, Ibaraki-ken, Japan

[73] Assignee: Riso Kagaku Corporation, Tokyo, Japan

[21] Appl. No.: 09/050,250

[22] Filed: Mar. 30, 1998

[30] Foreign Application Priority Data

Apr. 18, 1997 [JP] Japan .................................... 9-101854

[51] Int. Cl.⁶ ................................................... B41L 13/00
[52] U.S. Cl. ............................... 101/128.1; 101/DIG. 42; 400/613; 242/422
[58] Field of Search .................................... 400/234, 242, 400/246, 613, 613.1, 249; 101/DIG. 42, 128.1, 128.4; 242/419, 421, 422, 423, 423.1, 423.2

[56] References Cited

U.S. PATENT DOCUMENTS

| | | | |
|---|---|---|---|
| 5,279,472 | 1/1994 | Hongo et al. . | |
| 5,388,923 | 2/1995 | Dubois et al. | 400/613.1 |
| 5,558,019 | 9/1996 | Kawai et al. | 101/116 |
| 5,640,904 | 6/1997 | Sato et al. | 101/128.4 |
| 5,713,279 | 2/1998 | Lida et al. | 101/128.4 |
| 5,740,731 | 4/1998 | Kagawa | 101/128.4 |
| 5,755,397 | 5/1998 | Freese | 242/599.1 |
| 5,782,179 | 7/1998 | Kagawa et al. | 101/128.4 |
| 5,794,883 | 8/1998 | MacEwen | 242/423.2 |
| 5,816,149 | 10/1998 | Kagawa et al. | 101/128.4 |

FOREIGN PATENT DOCUMENTS

| | | |
|---|---|---|
| 0 506 623 | 9/1992 | European Pat. Off. . |
| 0 666 232 | 8/1995 | European Pat. Off. . |

OTHER PUBLICATIONS

Patent Abstracts of Japan, vol. 009, No. 256 (M–421), Oct. 15, 1985 & JP 60 106767A (Fujitsu KK), Jun. 12, 1985.
Patent Abstracts of Japan, vol. 011, No. 228 (M–610), Jul. 24, 1987 & JP 62 041140 A (Matsushita Graphic Commun Syst Inc: others: 01), Feb. 23, 1987.

*Primary Examiner*—Ren Yan
*Attorney, Agent, or Firm*—Kanesaka & Takeuchi

[57] ABSTRACT

A supporting device is adapted to support a rolled recording sheet. The rolled recording sheet has a flange with a supporting axis on each end portion, and is supported detachably and rotatably through the flange by the supporting device. The supporting device is formed of a pair of holders, each including a main body fixed to a predetermined position, a supporting portion disposed to the main body movably within a predetermined range for supporting the supporting axis of the flange, and an urging device for urging the supporting portion for a side surface of the flange.

8 Claims, 9 Drawing Sheets

SECTION 1-1

SECTION 2-2

SECTION 3-3

SUPPORTING DEVICE FOR ROLLED RECORDING SHEET

BACKGROUND OF THE INVENTION

The present invention concerns a supporting device for supporting a rolled recording sheet having a core like a tube and a long recording sheet rolled around it. In the present invention, a flange with a supporting axis is attached to the core of the rolled recording sheet. The rolled recording sheet is supported rotatably and detachably via this flange. As the recording sheet, there can be mentioned, for example, a thermosensible paper or a heatsensitive stencil sheet etc. The supporting device for rolled recording sheet in the present invention is used for providing such recording sheet with a recording apparatus. This invention enables the recording sheet to be recorded properly at all times in spite of condition of the flange-attachment to the core.

Generally, in an image forming apparatus such as a printer or a stencil printing apparatus and so on, a recording sheet on which characters or images are formed is contained inside in the form of a roll. For example, the thermosensible paper is used in a printer of a facsimile and so on and the heatsensitive stencil sheet is used in the stencil printing apparatus; these printing sheets are rolled around an axial tube like a paper-made one to form a cylindrical shape. This is named "rolled recording sheet". A flange is attached to each end portion of the axial tube of the rolled recording sheet. The flange is in a disc-form. On the center portion of the outer surface of the flange, a supporting shaft is provided protruding outwardly. On the center portion of the inner surface of the flange, an attachment portion of a cylindrical shape is provided to be inserted into the end portion of the axial tube. When the flange is attached to both the end portion of the axial tube, the centerline of the supporting shaft substantially coincides with that of the rolled recording sheet. Further, in the image forming apparatus, a recording-sheet supporting device with a pair of holders is disposed. The rolled recording sheet is mounted on the pair of the holders of the recording-sheet supporting device via the flanges. The rolled printing sheet is integrated with the flanges, to be supported rotationally and detachably on the recording-sheet supporting device.

In the constitution for supporting the rolled recording sheet thus stated, consideration will be made to a case where the thermosensitive paper or the heatsensitive stencil sheet is recorded by a recording means having a thermal head and a platen roller. If the platen roller rotates, the recording sheet is drawn from the rolled recording sheet. The recording sheet is sandwiched between the thermal head and the platen roller, to be recorded. Now, suppose that the rolled recording sheet is mounted on the holders of the recording-sheet supporting device in such a manner that it can rotate swiftly without any load. In this case, the recording sheet creases when being recorded by being pinched between the thermal head and the platen roller and conveyed. Such phenomenon is often happened when the recording sheet is thin. For example, the heatsensitive stencil sheet is very thin since it is composed of a thermoplastic resin film like a polyester film and a porous substrate such as a Japanese paper or woven fabric. Hence, in the case where the rolled recording sheet is mounted in such a manner that it can rotate without resistance, creasing is likely to occur in the recording sheet when recording is conducted by the thermal head and the platen roller.

In order to solve the problem stated above, a method is proposed as follows: namely, an elastic protrusion is disposed to a position facing the side surface of the flange in the rolled recording sheet supporting device of the image forming apparatus. This elastic protrusion comprises a plate spring and a protrusion attached to the front end of the plate spring. The rolled recording sheet is loaded via the flange when rotating by the protrusion contacting the outer peripheral surface of the flange. The recording sheet is stretched in a direction of drawing after unrolling from the rolled recording sheet, so that the sheet is conveyed to a gap between the thermal head and the platen roller. Namely, the recording sheet is conveyed to the gap with a tension (back-tension) acting in an opposite direction to that of conveying, therefore it is expected that creasing is unlikely to occur.

The flange has the supporting shaft which is to act as a rotating shaft of the rolled recording sheet when the flange attached to the rolled recording sheet is supported by the supporting device. In addition the flange performs the function of preventing the rolled recording sheet from drifting in the axial direction when the rolled recording sheet is attached to the supporting device. The flange also performs the function of preventing the unrolled recording sheet from moving diagonally across the regular direction during conveyance. Further, another function of the flange is to load the rolled recording sheet during rotation by contacting the elastic protrusion.

According to the existent constitution using the elastic protrusion, the protrusion gives a constant load to the rolled recording sheet that is rotating in order to make the back tension constantly act on the recording sheet, so that creasing in the sheet is prevented. In order to give a constant load to the rolled recording sheet during rotation by means of the elastic protrusion using the plate spring, it is necessary to fix the flange at a predetermined position relative to the axial tube. Also, the flange requires contacting the elastic protrusion in a predetermined position. Consequently, the flange should be inserted into the axial tube to reach the regular position when being attached to it. However, there may occur irregularity of the inner diameter and the longitudinal length of the axial tube in manufacturing. Further, if the axial tube is made from paper and humidity is low, the inner diameter may shrink. In these cases, the flange can not be inserted into the axial tube to reach the regular position. Further, if the axial tube is made from paper and humidity is high, the longitudinal length of the axial tube may enlarge so that the axial size with the flanges becomes longer than the required length.

If the flanges are improperly attached to the axial tube, or if the length of the axial tube enlarges, when the rolled recording sheet is mounted on the supporting device via the flanges, the elastic protrusion deforms over the regular value. This causes the contact pressure increase between the flange and the protrusion, so that a force restraining the rotation of the rolled recording sheet enlarges over the regular value. In short, the recording sheet is stretched in a direction of drawing after being drawn from the rolled recording sheet, and the sheet is conveyed to a gap between the thermal head and the platen roller; then, the back tension acting on the recording sheet enlarges excessively. This back tension causes slipping in conveyance of the recording sheet by the platen roller, so that the distance between dots formed on the recording sheet by the thermal head decreases. This brings about a drawback of deteriorating reproductive ability of images.

In a stencil printing apparatus using a heatsensitive stencil sheet as the recording sheet, the heatsensitive stencil sheet is perforated by a perforating portion. The perforating portion comprises a thermal head and a platen roller. The front end of the perforated heatsensitive stencil sheet is attached to the peripheral surface of a cylindrical printing drum. By rotating the printing drum, the heatsensitive stencil sheet is wound around it, and being cut at a predetermined length.

Printing paper is pinched between the drum and a press roller and conveyed forward while the drum is rotating, so that printing is completed. A part of a peripheral wall of the printing drum is an ink-permeable printing area. In the printing drum, an ink-supplying device is disposed. In one operation, the heatsensitive stencil sheet should be cut in such a size as to cover the printing area in a circumferential direction of the drum after being wound around the drum. The length of the heatsensitive stencil sheet that is cut and wound around the drum for one operation is not measured actually, but is controlled according to the rotating number of a conveying means for the heatsensitive stencil sheet so that the printing area is covered.

Consequently, in such stencil printing apparatus, if the flange is improperly attached to the axial tube as stated above, the back tension acting on the heatsensitive stencil sheet increases more than necessary, thereby causing slipping in the perforating portion. Owing to this fact, the stencil sheet that is actually cut and wound around the drum for one operation may be shorter than the regular length. In such case, a part of the printing area of the drum, through which ink can be permeated, is exposed. Ink may leak from the portion, and soiling a printed matter or the press roller. Further, in the case where the slipping continues, an identical portion of the heatsensitive stencil sheet is repeatedly perforated. The portion deteriorates in printing-resistance strength. As a result, there occurs a drawback that the stencil sheet is tore in the portion when being printed. Further, when the slipping occurs, the distance between dots perforated by the thermal head decreases more than the regular distance. As a result, an image perforated on the heatsensitive stencil sheet shrinks. This brings about a drawback of deteriorating reproductive ability.

In view of the above-described various problems, it is an object of the present invention to provide a supporting device for supporting a rolled recording sheet, wherein a stable back tension can be attained during conveyance of the recording sheet even in the case where the flanges are attached imperfectly to the rolled recording sheet, so that the preferable reproductive results of images can be attained.

SUMMARY OF THE INVENTION

A supporting device as defined in the first aspect of the present invention is adapted to support a rolled recording sheet which includes a flange with a supporting shaft on each end portion, and is supported detachably and rotatably via the flange by the supporting device. The supporting device comprises a main body fixed to a predetermined position, a supporting portion disposed to the main body movably within a predetermined range for supporting the supporting shaft of the flange, urging means for urging the supporting portion for a side surface of the flange.

In the supporting device defined in the second aspect of the present invention, the supporting portion urged by the urging means contacts the side surface of the flange near the supporting shaft in the supporting device as defined in the first aspect.

In the supporting device defined in the third aspect of the present invention, the supporting portion contacting the side surface of the flange is made from a material with at least one quality of high sliding ability and abrasion resistance in the supporting device as defined in the second aspect.

In the supporting device defined in the fourth aspect of the present invention, the urging means is a spring, and spring constant of the spring is set in such a way that the supporting portion loads the side surface of the flange substantially constantly, thereby causing substantially constant tension in a recording sheet drawn from the rolled recording sheet in the second aspect.

In the supporting device defined in the fifth aspect of the present invention, the main body and the supporting portion are made from resin, and the supporting device further comprising a metal mounting member for fixing the main body to the position with a strength capable of bearing a reactive force of a pressing force by the urging means in the second aspect.

In the supporting device defined in the sixth aspect of the present invention, an opening is formed on the supporting portion for receiving the supporting shaft of the flange in a predetermined direction in the second aspect.

In the supporting device defined in the seventh aspect of the present invention, an introductory portion is formed on the main body for guiding the supporting shaft of the flange to the opening of the supporting portion in the sixth aspect of the invention.

The supporting device as defined in the eighth aspect of the present invention comprises a flange holding means for rotating with the flange in contact with a peripheral portion of the flange at a position confronting the opening when the supporting shaft of the flange is mounted in the opening in the sixth aspect.

In the supporting device defined in the ninth aspect of the present invention, the flange holding means comprises a plate spring disposed to a predetermined position and a roller rotatably attached to the front end of the plate spring for contacting the peripheral portion of said flange in the eighth aspect.

The supporting device as defined in the tenth aspect of the present invention further comprises retaining means disposed to the opening for retaining the supporting shaft in the opening in the sixth aspect.

BRIEF DESCRIPTION OF THE DRAWINGS

FIG. 6(*b*) is a sectional view taken along line 6(*b*)—6(*b*) of FIG. 5;

FIG. 6(*c*) is a sectional view taken along line 6(*c*)—6(*c*) of FIG. 5;

DETAILED DESCRIPTION OF PREFERRED EMBODIMENTS

Figure 1:
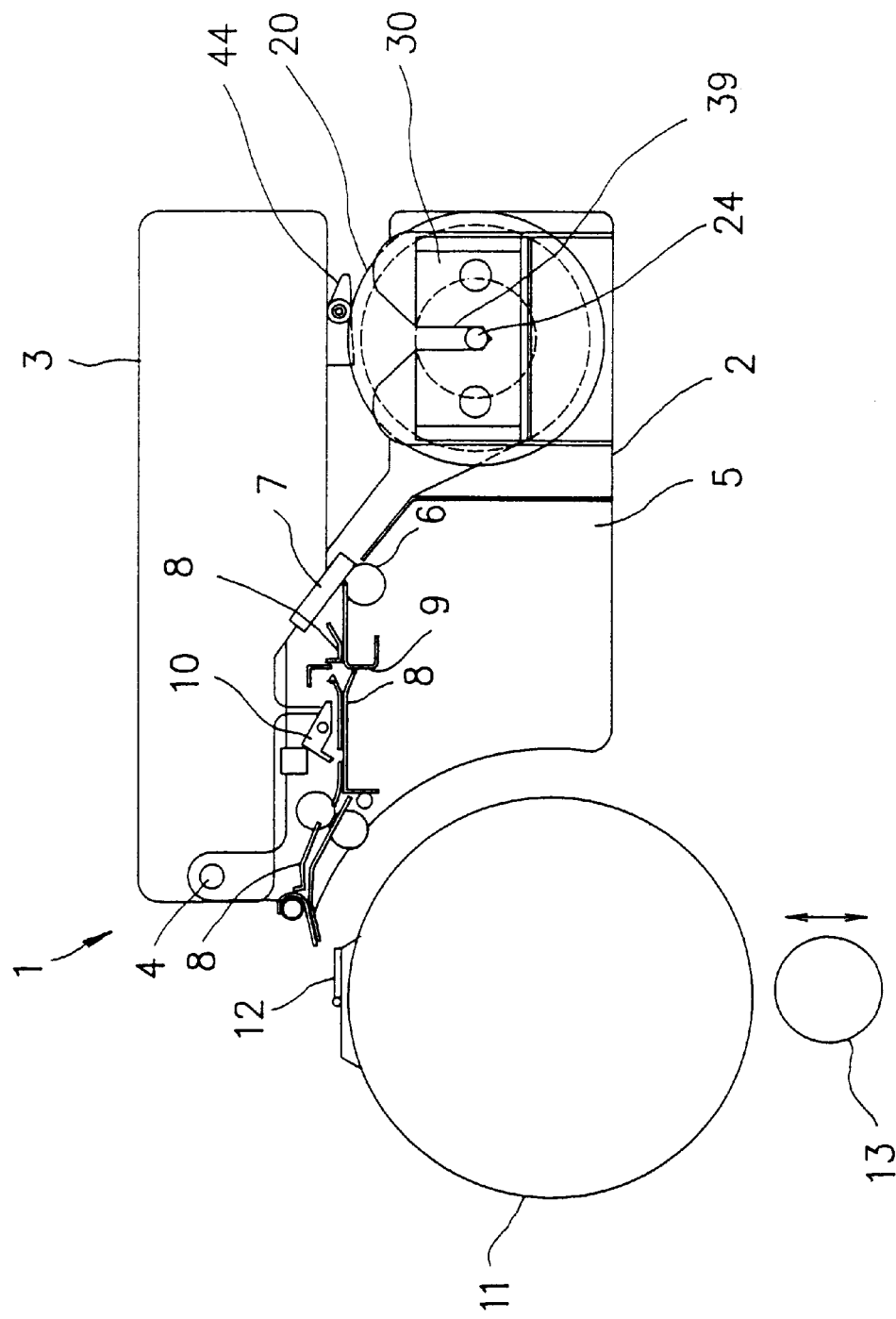
FIG. 1 is a sectional view showing one embodiment of the present invention with an upper unit closed.
Figure 2:
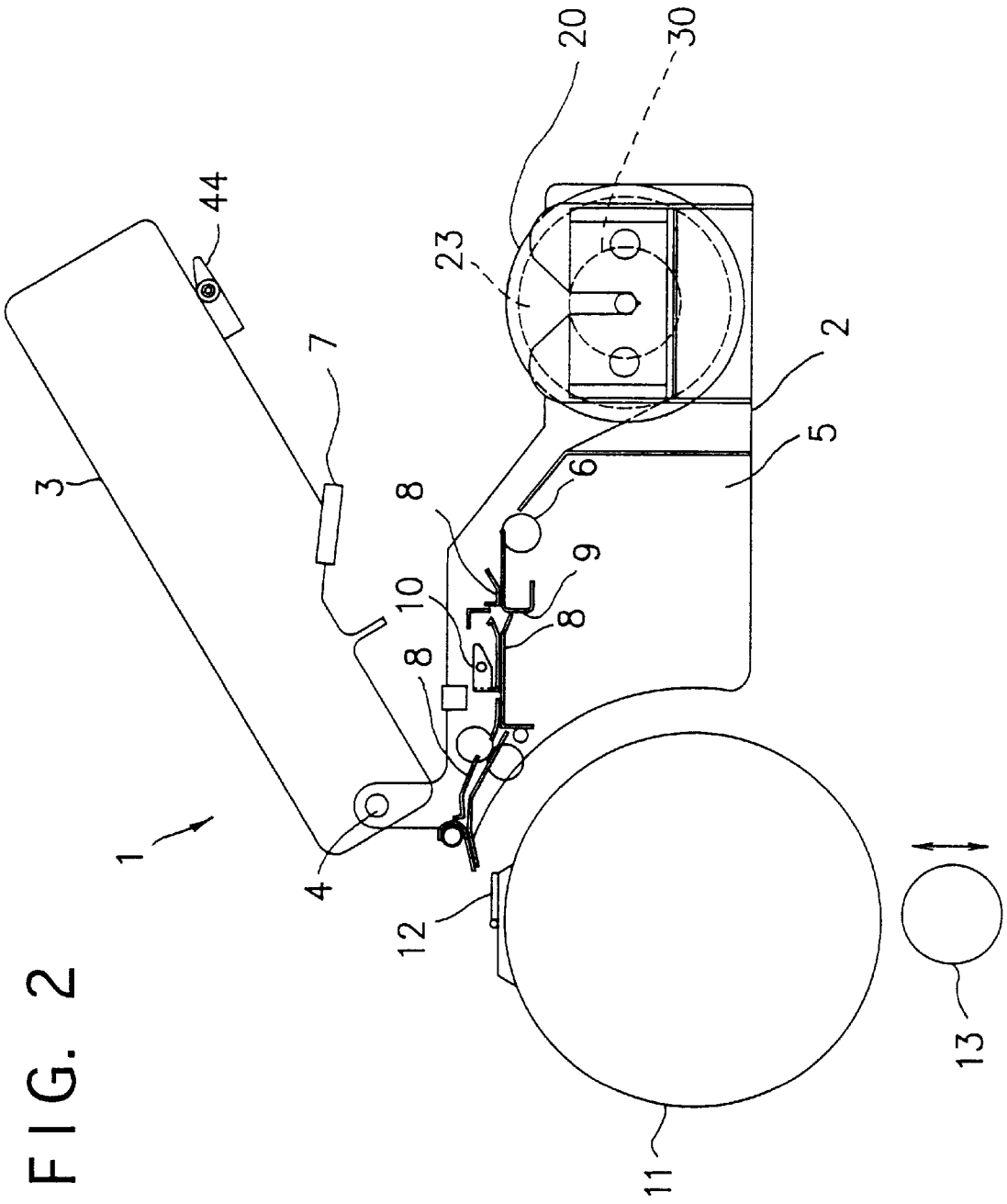
FIG. 2 is a sectional view showing one embodiment of the present invention with an upper unit opened.

One embodiment of the present invention will be explained with reference to FIG. 1 to FIG. 7. Referring to FIG. 1 and FIG. 2, the whole constitution of a stencil printing apparatus 1 will be explained. As shown in FIG. 1 and FIG. 2, a lower unit 2 in a box-shape is disposed to a frame (not shown) of the stencil printing apparatus 1. An upper unit 3 in a box-shape is pivotally mounted on the upper of the lower unit 2 via a shaft 4. In the right half of the lower unit 2, a supporting device for supporting a rolled recording sheet is disposed. The supporting device supports a roll of a heatsensitive stencil sheet rotatably and detachably. This supporting device will be explained in detail later.

In another half of the lower unit 2, a platen roller 6 is disposed as a part of a recording means. On the lower surface side of the upper unit 3 facing the platen roller 6, a thermal head 7 is disposed as another part of the recording means. As shown in FIG. 2, when the upper unit 2 is open, the thermal head 7 is kept apart from the platen roller 6. As shown ill FIG. 1, when the upper unit 1 is closed, both contact each other. After the upper unit 3 is opened, the front end of the stencil sheet is placed on the platen roller 6. Then, the stencil sheet is pinched between the platen roller 6 and the thermal head 7 by closing the upper unit 3. The platen roller 6 is driven to rotate and the thermal head 7 is energized. As a result, the stencil sheet is unrolled and perforated while being conveyed. The perforated stencil sheet is transferred to a printing drum 11, as explained later.

On the upper surface of the lower unit 2, a guide route 8 is disposed approximately horizontally for guiding the stencil sheet perforated by the platen roller 6 and the thermal head 7. Along the guide route 8, a cutter 9, movable plate 10 and a conveying means for the stencil sheet are placed in the direction of conveyance of the stencil sheet. The movable plate 10 shuts the guide route 8 when the upper unit 3 is open, and opens the route 8 when the upper unit 3 is closed. When a roll of the stencil sheet is initially installed in the stencil printing apparatus, an initial position of the front end of the stencil sheet can be detected by inserting the stencil sheet into the guide route 8 until it reaches the plate 10.

A printing drum 11 is rotatably disposed to a frame (not shown) of the stencil printing apparatus 1. The printing drum 11 is located adjacent to the lower unit 2 in a direction of conveying the stencil sheet. The top of the printing drum 11 is facing the exit of the guide route 8. A clamp device 12 is disposed to the peripheral wall of the printing drum 11, so that the front end of the stencil sheet can be fixed to the printing drum 11. The stencil sheet, a front end of which fixed to the printing drum 11 is cut by the cutter 9 in a length for one operation, while being wrapped around the peripheral wall by rotating of the printing drum 11. A part of a peripheral wall of the printing drum 11 around which the stencil sheet is wrapped is an ink-permeable printing area. An ink-supplying device (not shown) is disposed inside the printing drum 11. The ink-supplying device supplies an ink to the inner surface of the peripheral wall of the printing drum 11. Beneath the printing drum 11, a press roller 13 is vertically movably mounted. The press roller 13 moves within a range from a position for pressing and contacting the printing drum 11 to a position at a distance from the printing drum 11. The printing drum 11 is driven to rotate after being wrapped by the perforated stencil sheet. A printing paper is fed between the printing drum 11 and the press roller 13, and the press roller 13 moves upwardly in synchronization with the rotation of the printing drum 11. The printing paper is pinched between the printing drum 11 and the press roller 13 and conveyed forward, so that printing is completed.

A rolled recording sheet 20 and a supporting device 30 for supporting the rolled recording sheet will be explained with reference to FIG. 3 to FIG. 6.

Figure 3:
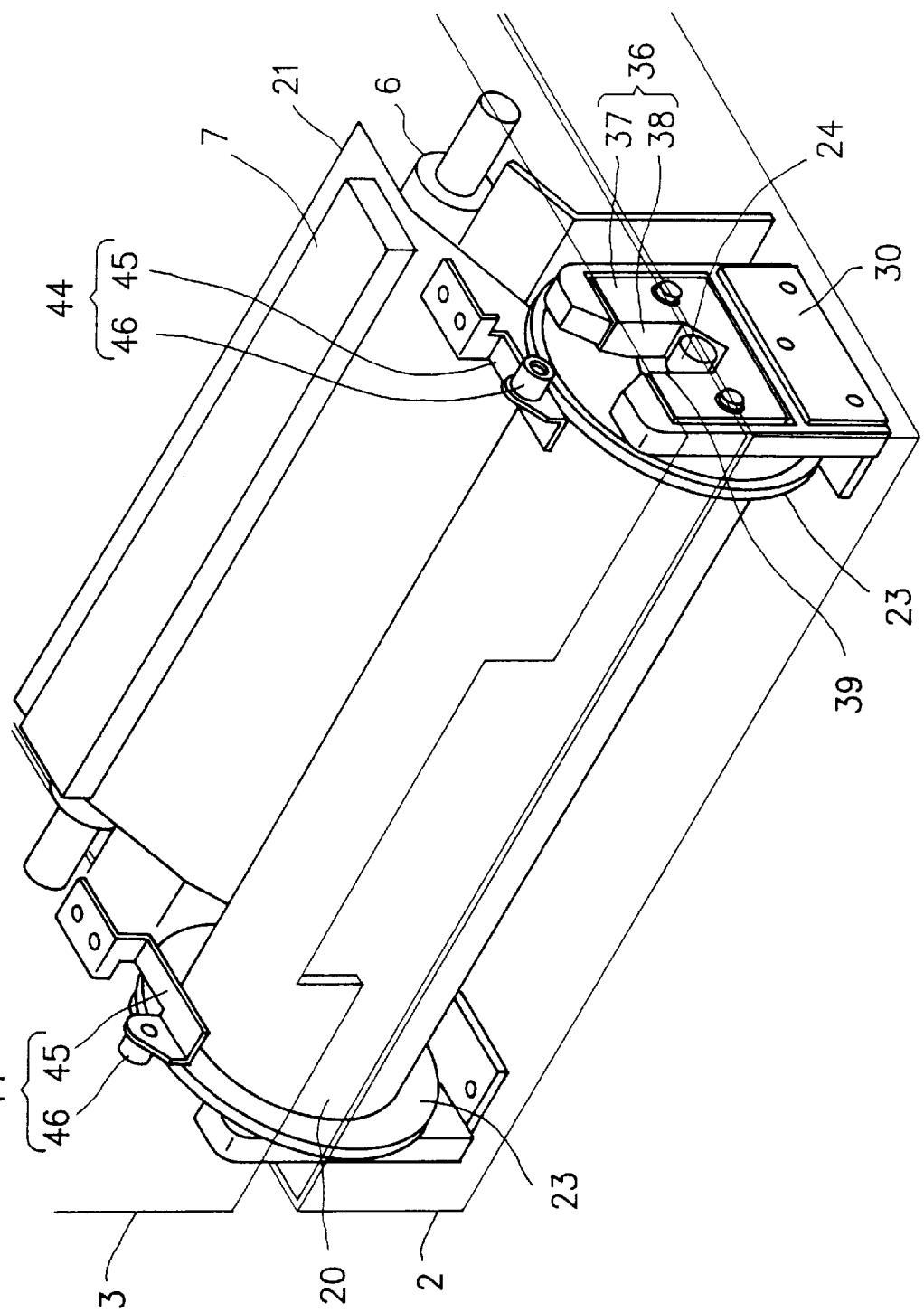
FIG. 3 is a perspective view showing the supporting device for supporting a rolled recording sheet of one embodiment of the present invention.
Figure 4:
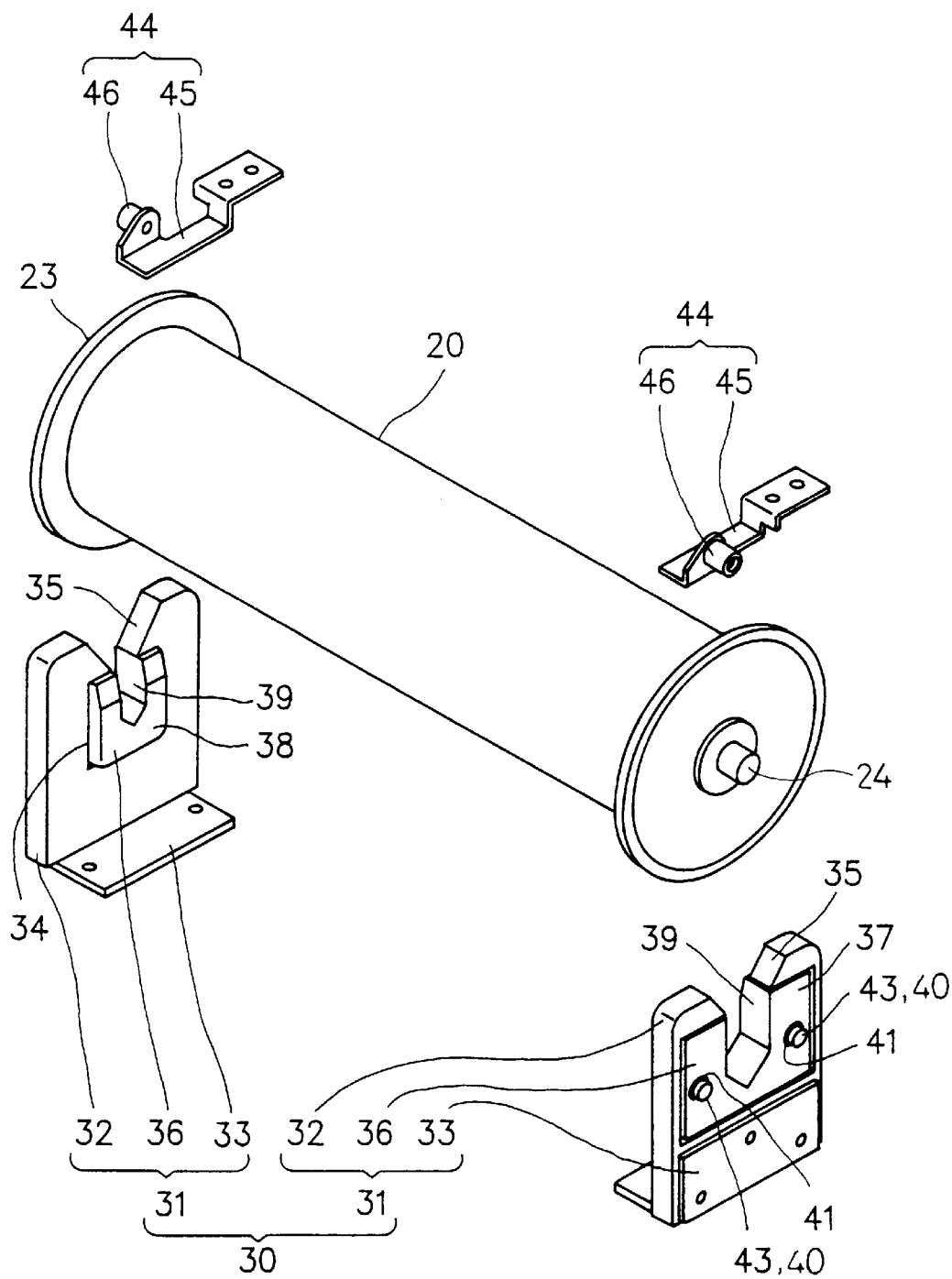
FIG. 4 is an exploded perspective view showing the supporting device for supporting a rolled recording sheet of one embodiment of the present invention.

As shown in FIG. 3 and FIG. 4, a stencil sheet 21 for use in this embodiment as a recording sheet is in the shape of a roll. As shown in the sectional view of FIG. 6(a), an axial tube 22 is a hollow cylinder with open ends; the stencil sheet 21 as a recording sheet is rolled up around the axial tube 22 into a cylinder shape. The combination of the stencil sheet 21 and the axial tube 22 will be referred to as the rolled recording sheet 20. As shown in FIG. 3 and FIG. 4, flanges 23 are respectively attached to both ends of the axial tube 22 of the rolled recording sheet 20. The flange 23 is in the form of a disc having a diameter larger than that of the rolled recording sheet 20 itself. In the center of the outer surface of the flange 23, a supporting shaft 24 is disposed protruding outwardly. As shown in the sectional view of FIG. 6(a), in the center of the inner surface of the flange 23, an inserting portion 25 is disposed in the form of a hollow cylinder. The inserting portion 25 is inserted into the axial tube 22. In the case where the flange 23 is properly attached to the axial tube 22, the supporting axis 24 substantially coincides with the centerline of the rolled recording sheet 20.

As shown in FIG. 3 and FIG. 4, the supporting device 30 for supporting the rolled recording sheet 20 has a pair of holders 31,31 that in placed at a certain distance. Each holder 31 has the identical constitution. A main body 32 of the holder 31 is a rectangular plate made from resin. As the resin, there can be used ABS resin and so on. The main body 32 is fixed to the predetermined position on the lower unit 3 via a mounting member 33 of L-shape. This mounting member 33 is made from metal, having rigidity higher than that of ABS resin from which the main body 32 is made. A supporting hole 34 is formed near the center of the main body 32 in a rectangular shape. On the upper edge of the main body 32, an introductory portion 35 is formed in a triangle shape for receiving the supporting shaft 24 of the rolled recording sheet 20.

As shown in FIG. 4 to FIG. 6(a), a supporting portion 36 is disposed to the main body 32 movably within a predetermined range for supporting the supporting shaft 24 of the flange 23. The supporting portion 36 has a rectangular base plate 37 and a support 38 disposed to the center of the base plate 37. The support 38 is protruding from the surface of the base plate 37. The shape of the support 38 is approximately the same as the supporting hole 34. An opening 39 is formed vertically in the support 38 for receiving the supporting shaft 24 of the flange 23 from the upper side. The width of the opening 39 approximately coincides with the diameter of the supporting shaft 24 of the flange 23. The bottom of the opening 39 comprises two slopes, contacting the outer spherical surface of the supporting shaft 24 at two portions. By attaching the base plate 37 of the supporting portion 36 to the outer side of the main body 32, the support 38 of the supporting portion 36 protrudes over the inner side of the main body 32 (toward the flange 23) through the supporting hole 34, so that the introductory portions 35 of the main body 32 extend to the opening 39 of the supporting portion 36.

As shown in the sectional view of FIG. 6(c) and FIG. 4, a pair of guide protrusions 40 and 40 is formed in the shape of a round bar on the outer side of the main body 32. Further, a pair of guide holes 41 and 41 is formed on the base plate 37 of the supporting portion 36. The supporting portion 36 is attached to the outer side of the main body 32, so that the guide protrusion 40 enters the guide hole 41. A coil spring 42 as an urging means is fitted on the guide protrusion 40 protruding though the guide hole 41. A stopper 43 is fixed on the end portion of the guide protrusion 40. Namely, the coil spring 42 is arranged between the stopper 43 fixed to the guide protrusion 40 of the main body 32 and the base plate 37 which the guide protrusion 40 passes though in the supporting portion 36. As shown in the sectional view of FIG. 6(c), the coil spring 42 urges the supporting portion 36 toward the main body 32. As shown in FIG. 4, the support 38 of the supporting portion 36 protrudes over the inner side of the main body 32 (toward the flange 32).

Consequently, if the supporting portion 36 is forced in the opposite direction to that of urging by the coil spring 42, the portion 36 can move outwardly in the axial direction of the rolled recording sheet 20 from the initial position, so that another rolled recording sheet having larger distance between two flanges can be received in the supporting device.

In this embodiment, a spring with small spring constant is selected as the coil spring 42. Specifically, the spring constant of the coil spring 42 is properly arranged so that the supporting portion 36 loads the side surface of the flange 23 substantially constantly, even in the case where the supporting portion 36 moves from the regular position due to the difference of size in the axial direction of the rolled recording sheet 20. Hence, when the stencil sheet 21 is perforated in the stencil printing apparatus 1 stated before, the rolled recording sheet 20 rotates under a constant load, so that a substantially constant tension acts on the stencil sheet 21 in unrolling from the rolled recording sheet 20. In the embodiment, although the coil spring is illustrated, a plate spring can be adopted as an urging means if the condition explained above is satisfied.

The supporting portion 36 is made from resin such as POM (polyoxymethylene) and so on. The main body 32 is made from resin such as ABS (acrylonitrile-butadien-styrene). POM is superior to ABS in sliding ability and abrasion resistance.

As shown in FIG. 1 and FIG. 2, on the lower surface of the upper unit 3, a pair of flange holding means 44 and 44 is disposed. A pair of flange holding means 44 and 44 corresponds to a pair of flanges 23 and 23. As shown in FIG. 3 to FIG. 6(c), the flange holding means 44 comprises a plate spring 45 fixed to the predetermined position and a roller 46 rotatably attached to the front end of the plate spring 45 for contacting the outer peripheral surface of the flange 23. The plate spring 45 is made from stainless. The roller 46 is made from POM (polyoxymethylene).

As shown in FIG. 2, when the upper unit 3 is lifted up in order to store or change the rolled recording sheet 20, the flange holding means 44 moves upwardly together with the upper unit 3, leaving the flange 23 of the rolled recording sheet 20.

Figure 5:
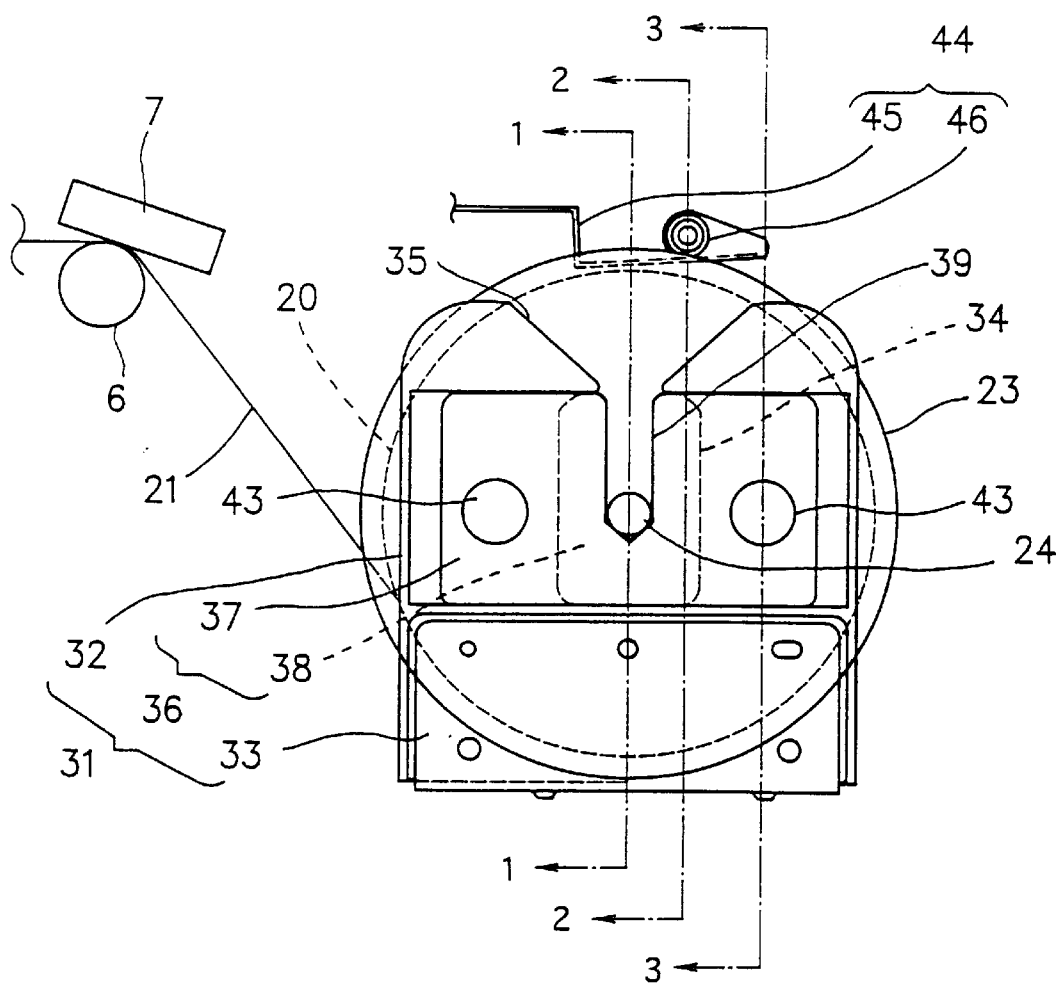
FIG. 5 is a side view showing the supporting device for supporting a rolled recording sheet of one embodiment of the present invention.
Figure 6:
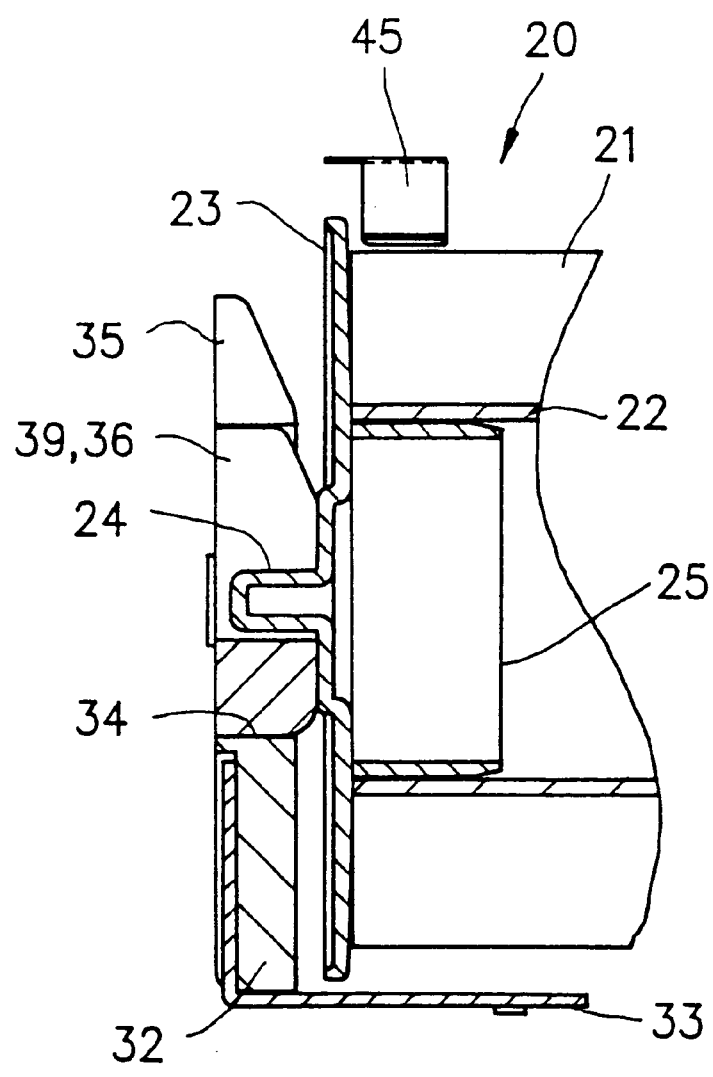
FIG. 6(*a*) is a sectional view taken along line 6(*a*)—6(*a*) of FIG. 5.
Figure 6:
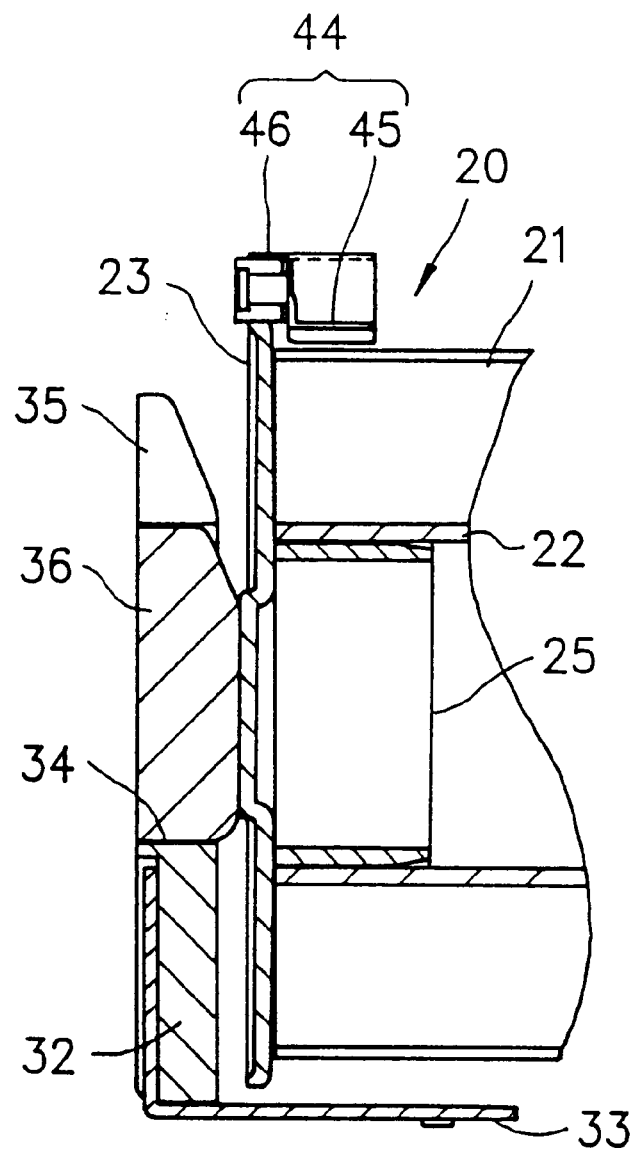
Figure 6:
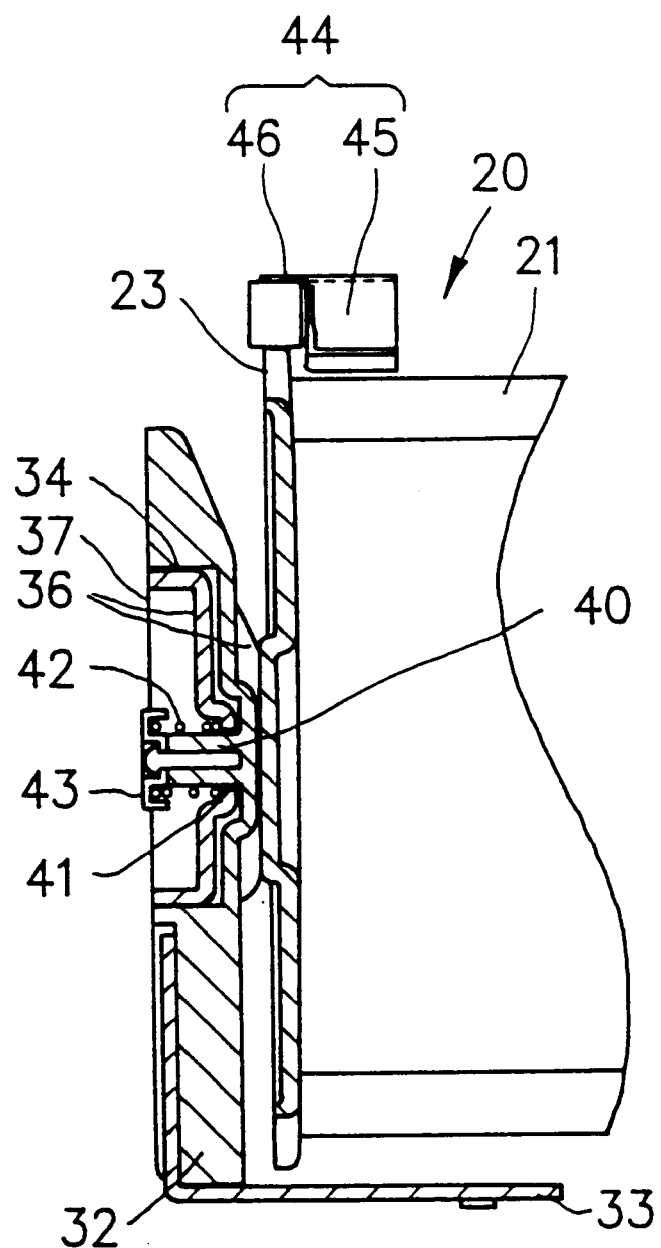

As shown in FIG. 1, the supporting shaft 24 of the rolled recording sheet 20 is inserted into the opening 39 and the upper unit 3 is closed. As a result, as shown in FIGS. 3, 5 and 6(c), the roller 46 of the flange holding means 44 contacts the outer peripheral surface of the flange 23 at a position confronting the entrance of the opening 39.

According to the present embodiment, the holder 31 for supporting the rolled recording sheet 20 is composed of two parts: one is the supporting portion 36 for supporting the supporting shaft 24 of the flange 23, and the other is main body 32 for movably supporting such supporting portion 36. Further, the supporting portion 36 is pressed toward the flange 23 by the urging means. Consequently, if being forced in the opposite direction to that of urging by the coil spring 42, the portion 36 can move outwardly in the axial direction of the rolled recording sheet 20. Namely, even in the case where the supporting portion 36 receives a rolled recording sheet having flanges improperly attached to the axial tube, it is possible to properly install the rolled recording sheet since the supporting portion 36 can move in the axial direction.

The spring constant of the coil spring 42 is designed in such a manner that the supporting portion 36 loads the side surface of the flange 23 substantially constantly. Namely, the force effecting on the side surface of the flange 23 by the coil spring 42 via the supporting portion 36 is not likely to change. Hence, the stencil sheet is stretched by an always-stable back tension when being unrolled and conveyed to the recording means on perforation. The tension is considered to be substantially constant, therefore reproductive results in images attained at the recording means can be improved.

Further, according to the present embodiment, the supporting portion 36 contacts a center portion that is especially adjacent to the supporting shaft 24 on the side surface of the flange 23. When the stencil sheet 21 is unrolled from the rolled recording sheet 20, the flange 23 rotates. However, the friction acting between the supporting portion 36 and the center portion of the flange 23 won't lead to generation of heat and marking scars since the relative speed between the supporting portion 36 and the center portion is rather low.

Further, according to the present embodiment, when the rolled recording sheet 20 is installed in the supporting device 30, the peripheral surface of the flange 23 is held by the flange holding means 44 at a position confronting the entrance of the opening 39 of the supporting portion 36. Therefore, when the stencil sheet 21 is drawn and unrolled from the rolled recording sheet 20, flexibility of the plate spring 45 can prevent the rolled recording sheet 20 from being pulled up from the supporting device 30. Further, in the flange holding means 44, the roller 46 contacts the flange 23, rotating along with the rotation of the flange 23; so the rolled recording sheet 20 can rotate efficiently when the stencil sheet 21 is drawn and unrolled.

The flange holding means 44 is disposed to the upper unit 3; therefore, the flange holding means 44 moves upwardly with the upper unit 3, leaving the supporting device 30, when the upper unit 3 is opened for setting the rolled recording sheet 20 in the supporting device 30. Consequently, when the rolled recording sheet 20 needs operation of installment or exchange, the flange holding means 44 never obstruct such operation. Even if the rolled recording sheet 20 is unstably supported in the supporting device 30 owing to an improper installment, the rolled recording sheet 20 can be set at a proper position in the device 30 once the flange holding means 44 pushes down the rolled recording sheet 20 after closing the upper unit 3.

Figure 7:
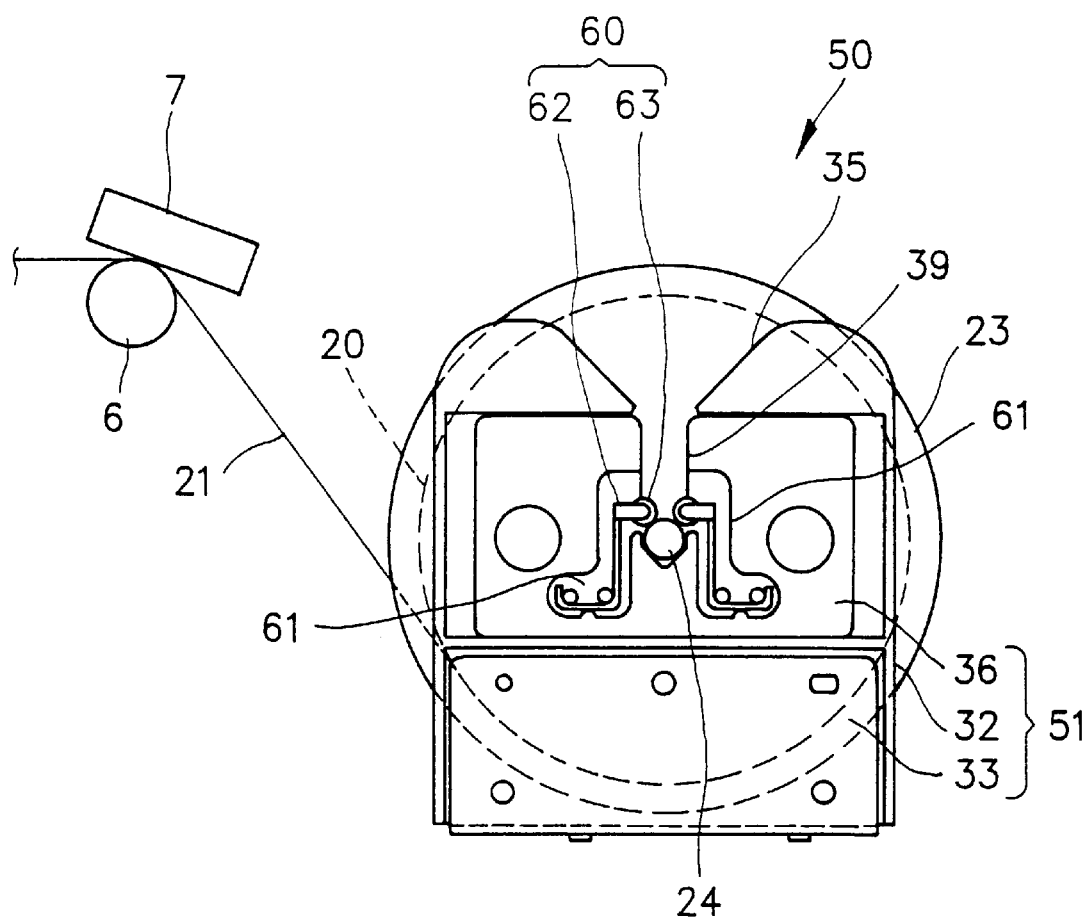
FIG. 7 is a side view showing another embodiment of the present invention.

Next, another embodiment of the present invention will be explained with reference to FIG. 7. A supporting device 50 in the present embodiment for supporting the rolled recording sheet has a holder 51. The holder 51 has a retaining means 60 for retaining the supporting shaft 24 within the opening 39. A recess 61 is formed on each side of the opening 39 of the supporting portion 36. Each recess 61 communicates with the opening 39 at each side thereof. A plate spring 62 of L-shape is fixed in each recess 61 respectively. Each plate spring 62 is fixed inside each recess 61 by engaging with three fixing protrusions integrally formed with the supporting portion 36 inside each recess 61. A roller 63 is rotatably disposed to the front end of each plate spring 62. The rollers 63 and 63 protrude inside the opening 39, facing each other in the opening 39 at a certain distance.

The rolled recording sheet 20 is installed inside the supporting device 50 for supporting the rolled recording sheet 20. The supporting shaft 24 of the rolled recording sheet 20 is inserted into the opening 39 and pressed against the rollers 63 and 63. The supporting shaft 24 passes through the rollers 63 and 63 while the plate springs 62 and 62 deform. Then, the supporting shaft 24 is positioned on the bottom of the opening 39, while being held at the upper side by the two rollers 63 and 63. In order to disengage the supporting axis 24 from the opening 39, the supporting shaft 24 requires passing through the rollers 63 and 63 by deforming the plate springs 62 and 62; so the operation of unrolling the stencil sheet 21 is not likely to cause disengaging the supporting shaft 24 from the opening 39. In the present embodiment, the flange holding means 44 explained above is not necessarily required.

The supporting devices 30 and 50 explained in the embodiments are used for supporting the stencil sheet 21 rolled around the axial tube 21, and being installed in the stencil printing apparatus 1 with a function of perforating. However, the supporting device for the rolled recording sheet in the present invention does not apply only to the rolled stencil sheet. The supporting device for the rolled recording sheet in the present invention is such that it detachably and rotatably supports a rolled sheet on which any kind of recording can be effected. Therefore, the method, the operation and the intended use of the recording are not limited. Further, the supporting device may be separated from a recording apparatus, or may be installed inside the recording apparatus. Since the type of the recording sheet is not limited, consequently the constitution and the type of the recording apparatus are also unlimited.

According to the supporting device for the rolled recording sheet of the present invention, the supporting portion is formed separate from the main body and being urged toward the side surface of the flange. Therefore, the rolled sheet can be accepted easily, even if the axial length of the rolled recording sheet is beyond the regular size, because the supporting portion can move in the axial direction.

Further, the urged supporting portion is in contact with the area adjacent to the supporting axis on the side surface of the flange. Therefore, harmful effect of heat and scars on the supporting portion is fairly smaller than the case where the supporting portion is contacted with the side surface of the flange at the outer peripheral edge that is apart from the supporting shaft.

Further, the supporting portion is made from such material that is superior to the existent material like ABS resin and so on in sliding ability and abrasion resistance; so the durability of the device in the present invention is improved and the rotation of the rolled recording sheet is further facilitated.

Further, the spring constant of the coil spring as the urging means is properly designed for urging the supporting portion. Therefore, the load on the flange by the supporting portion does not substantially increase, even in the case where the supporting portion moves when the rolled recording sheet with flanges irregularly attached is inserted into the supporting device. Consequently, the rolled recording sheet can rotate under steady load so that the recording sheet can be drawn and stretched with an appropriate tension acting on it.

Further, the main body can resist against the reaction by the spring that is urging the supporting portion since the main body is fixed to the predetermined position by the metal mounting member with a high rigidity.

Further, a roller is attached to the end of the plate spring, thereby holding the outer peripheral surface of the flange downwardly; so the flange is not likely to wear and to be scarred, enabling the rolled recording sheet to rotate efficiently.

What is claimed is:

1. A supporting device adapted to support a rolled recording sheet, said rolled recording sheet having a flange with a supporting shaft on each end portion, and being supported detachably and rotatably via said flanges by said supporting device, said supporting device comprising:

a pair of holders, each including a main body fixed to a predetermined position; a supporting portion disposed to said main body movably within a predetermined range for supporting said supporting shaft of said flange, said supporting portion having an opening for receiving said supporting shaft of the flange in a Predetermined direction; and urging means for urging said supporting portion toward a side surface of said flange; and flange holding means contacting a peripheral portion of the flange at a position confronting the opening when the supporting shaft of the flange is mounted in the opening, and rotating with the flange.

2. A supporting device as defined in claim 1, wherein said supporting portion urged by said urging means contacts the side surface of said flange near said supporting shaft.

3. A supporting device as defined in claim 2, wherein said supporting portion contacting the side surface of said flange is made from a material with at least one quality of high sliding ability and abrasion resistance.

4. A supporting device as defined in claim 2, wherein said urging means is a spring, and spring constant of the spring is set in such a way that said supporting portion loads the side surface of said flange substantially constantly, thereby causing substantially constant tension in a recording sheet drawn from said rolled recording sheet.

5. A supporting device as defined in claim 2, wherein said main body and said supporting portion are made from resin, and said supporting device further comprising a metal mounting member for fixing said main body to a position with a strength capable of bearing a reactive force of a pressing force by said urging means.

6. A supporting device as defined in claim 1, wherein an introductory portion is formed on said main body for guiding said supporting shaft of said flange to said opening of said supporting portion.

7. A supporting device as defined in claim 1, wherein said flange holding means comprises a plate spring disposed to a predetermined position and a roller rotatably attached to a front end of said plate spring for contacting said peripheral portion of said flange.

8. A supporting device as defined in claim 1, further comprising retaining means disposed to said opening for retaining said supporting shaft in said opening.

* * * * *